No. 624,574. Patented May 9, 1899.
J. SULLY.
GALVANIC BATTERY.
(Application filed Jan. 27, 1899.)
(No Model.)
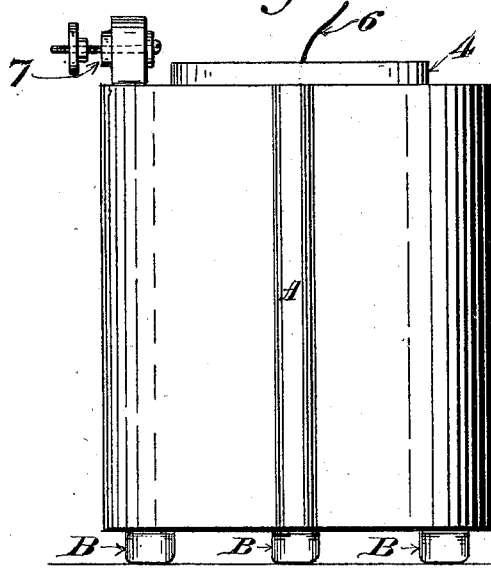
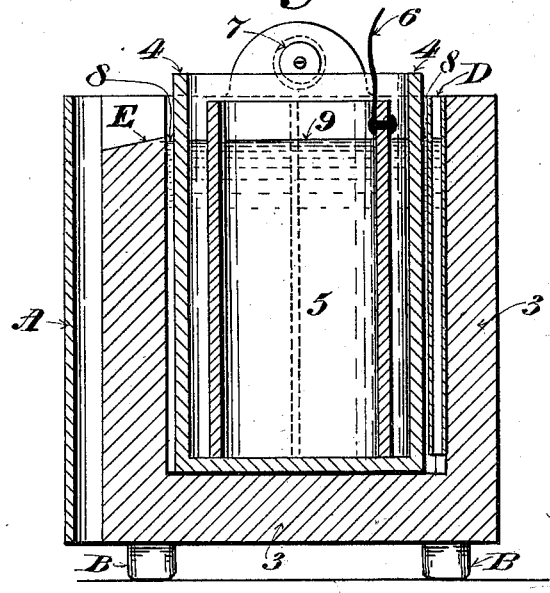
WITNESSES:
Charles S. Towle
Stevenson Towle
INVENTOR
James Sully

UNITED STATES PATENT OFFICE.

JAMES SULLY, OF NEW YORK, N. Y.

GALVANIC BATTERY.

SPECIFICATION forming part of Letters Patent No. 624,574, dated May 9, 1899.

Application filed January 27, 1899. Serial No. 703,623. (No model.)

*To all whom it may concern:*

Be it known that I, JAMES SULLY, a citizen of the United States, and a resident of New York, in the county of New York and State of New York, have invented certain new and useful Improvements in Galvanic Batteries, of which the following is a specification.

The objects of my invention are to produce a two-liquid galvanic-battery cell of the Grove and Bunsen type and by improving the general form of the cell to eliminate a greater part of the internal resistance, as well to avoid the obnoxious nitrous emanations. I attain these objects by mechanism illustrated in the accompanyings drawings, in which—

Figure 1 is a side elevation of one complete cell, showing the containing vessel, which is also the negative electrode, exposed externally to the air. A is a rubber tube cemented to the outside of the containing vessel, extending from the top to the bottom and opening at the top inwardly into a slot cut half an inch deep in the top of the carbon to discharge the fluid from that vessel without overflowing the vessel or the porous cup; *b b b*, three rubber knobs fastened on the bottom of the vessel to raise the vessel to permit the passage of the expelled fluid to the center of a support, on which the vessel may rest; 4, top of porous cup; 6, wire connecting zinc; 7, binding-post of carbon.

Fig. 2 is a vertical section of the cell. 3 3 3 mark the walls of the vessel, an inch or more thick; *d*, a glass feed-tube sunk into the inner side of the carbon vessel, extending nearly to the bottom and fastened with beeswax; 4, an earthen porous vessel; 5, a cylinder of amalgamated zinc; 6, wire riveted to zinc to accommodate a connector; 7, binding-post of negative vessel; 8, nitric acid in the carbon vessel; 9, sodium chlorid in the porous vessel; E, slot in carbon vessel.

To carry my invention into effect, I use as the negative electrode a gas-coke-carbon-containing vessel left exposed externally to the air. In order to leave the carbon vessel porous, so that the fluid may permeate its walls without passing onto the surface, I heat the cup sufficiently hot to melt beeswax and while hot rub over the surface a small quantity of beeswax. This closes the pores sufficiently to prevent the liquid from coming onto the surface, but does not prevent the occlusion of the air.

For the electrolyte I use a weak solution of salt (chlorid of sodium) placed with the zinc in the porous cup.

For the depolarizing fluid I use strong commercial nitric acid placed in the carbon vessel.

Heretofore Letters Patent for a carbon-containing vessel exposed externally to the air were granted to me, dated July 6, 1897, Nos. 585,854 and 585,855. With the exception of the addition of the feed and discharge pipes that vessel is identical with my present invention.

In the form that I have constructed this battery I find that in consequence of the absence of a fluid exterior to the negative electrode the internal resistance is materially reduced and that the air acting upon the carbon preserves its gas-absorbing property. The freed nitrogen absorbed by the carbon is oxidized anew within the carbon, thus preventing nitrous emanations.

The carbon vessel that I have described in my drawings is five and one-half inches high by five inches diameter over all. The walls are one inch thick, leaving the internal diameter three inches and the depth four and one-half inches. I have found this comparatively great bulk of carbon necessary in order to render it almost impermeable to a fluid and to facilitate the absorption of the freed gases.

In the carbon vessel I use a porous vessel about two and one-half inches in diameter, and in the porous vessel a thin cylinder of zinc, about two inches in diameter. This places the two electrodes about one-half an inch apart, while the acid occupies a space of about one-fourth of an inch surrounding the porous vessel.

To charge the battery, it requires two gills of salt water in the porous vessel and one gill of nitric acid in the carbon vessel. The cell is constant on short circuit for only eight or ten hours in consequence of the decomposition of the acid. By the addition of acid only it may be kept constant for three or four days, when it will be necessary to renew or partially renew the salt water.

There are practically no deposits in either vessel. Consequently the discharging process leaves the cell clean, and the renewal in this manner is perfect.

In order to renew the cell without handling the parts that have been exposed to the nitric acid, I pour the acid into a glass funnel fitting into the tube within the vessel, thus forcing up the spent fluid to the discharge-pipe. The electrolyte in the porous cell may be treated in the same manner. I find that when forced into the outer vessel it does not mix with the acid. When desirable, to avoid handling the acid the cell may be washed out through the tubes with water.

To prepare the electrolyte, dissolve six or eight ounces of common salt (chlorid of sodium) in one quart of water, preferably hot water, and let it cool.

To prepare the battery, place the carbon vessel upon the support and a glass or earthenware receptacle at the end of the support. Place the porous cup in the carbon vessel and the zinc in the porous cup. Then fill the porous cup with the salt water, after which pour one gill of nitric acid through a glass funnel into the feed-tube. When the acid is exhausted, add one gill or less of acid through the feed-tube, thus forcing the spent fluid through the discharge-pipe to the receptacle.

The electrolyte may be renewed by forcing the fluid into the containing vessel, with fresh fluid fed into the bottom of the porous cup through a rubber tube attached to a funnel, or the fluid may be drawn off with a syringe.

Having fully described my invention, what I claim, and desire to secure by Letters Patent, is—

A galvanic-battery cell, composed of a negative, porous, gas-coke-carbon-containing vessel, left exposed externally to the air and rendered sufficiently dense to prevent the passage of an electrolytic fluid onto its exterior surface, and so constructed that the cell may be charged, recharged and discharged through suitable pipes arranged as follows—on the exterior surface of the carbon vessel, a glass or rubber discharge-tube is partially sunk into and cemented to the carbon, extending from the top to the bottom of the vessel, and opening inwardly at the top into a slot cut half an inch deep in the top of the carbon vessel; and a glass tube sunk and fastened into the inner wall of the carbon vessel, extending from the top to near the bottom, as a means of charging the cell with acid from the bottom upward, or recharging it and thus forcing up the spent fluid to the discharge-pipe; together with the whole forming a primary battery composed of the following elements: a cylinder of amalgamated zinc immersed in a solution of chlorid of sodium contained in an earthen porous cup; the porous cup partially immersed in commercial nitric acid contained within the carbon-containing vessel and resting upon the bottom of that vessel; all as described.

Signed at New York, in the county of New York and State of New York, this 23d day of January, A. D. 1899.

JAMES SULLY.

Witnesses:
W. J. HAUSER,
SEBASTIAN ROGGEMANN.